C. W. DICKINSON.
PLOW.
APPLICATION FILED MAY 4, 1907.
964,766.
Patented July 19, 1910.
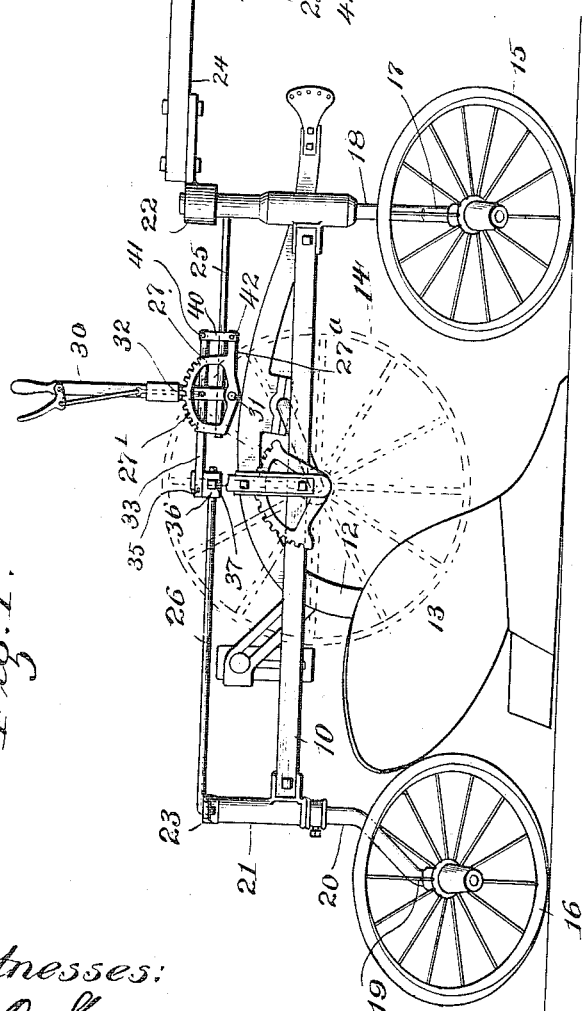
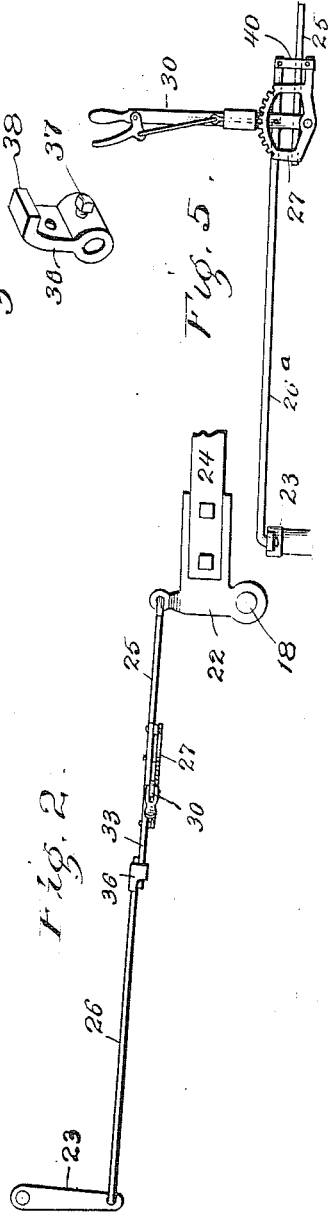
Witnesses:
O. O. Hurvey
Wm. P. Bond
Inventor:
Clinton W. Dickinson
by Fred Gerlach
his Atty.

UNITED STATES PATENT OFFICE.

CLINTON W. DICKINSON, OF LA CROSSE, WISCONSIN, ASSIGNOR OF ONE-HALF TO ALBERT HIRSHHEIMER, OF LA CROSSE, WISCONSIN.

PLOW.

964,766.

Specification of Letters Patent.   Patented July 19, 1910.

Application filed May 4, 1907.   Serial No. 371,800.

*To all whom it may concern:*

Be it known that I, CLINTON W. DICKINSON, a resident of the city of La Crosse, in the county of La Crosse and State of Wisconsin, have invented certain new and useful Improvements in Plows, of which the following is a full, clear, and exact description.

The invention relates to plows mounted on carrying-wheels and more particularly to the connections for controlling the rear caster or furrow-wheel.

It is now common to provide a steering-connection for controlling the rear furrow or caster-wheel, the connection having its front end controlled by the draft of the team, being usually connected to the tongue or front furrow-wheel or some part which is turned by the team, so the rear wheel will be turned responsively in opposite direction to the movement of the front furrow-wheel. These connections are usually adjustable so the rear wheel can be set to travel at an angle with respect to the line of draft to crowd the plow laterally in either one direction or the other to overcome any tendency of the plow to move up or down hill in hill-side work *i. e.*, when a furrow is being turned uphill the tendency of the plow is to move toward the land and cut too wide a furrow and when a furrow is being turned downhill the tendency of the plow is to move downwardly and cut too narrow a furrow-slice. This tendency is usually overcome by angling the rear wheel with respect to the line of draft to crowd the plow laterally sufficiently to cause it to turn a furrow-slice of the proper size. These steering connections usually comprise a rod or rods and a sliding-connection which permits the adjustment thereof. A sliding connection has been found to be objectionable because the parts are usually roughly made and when they become strained or bent they cannot be readily adjusted as desired.

The invention designs to provide an improved connection for steering or controlling the rear furrow-wheel in which the employment of a sliding joint or connection of the parts is avoided.

A further object of the invention is to provide a simple construction for an adjustable connection for this purpose.

The invention consists in the several novel features hereinafter set forth and more particularly defined by claims at the conclusion hereof.

In the drawings: Figure 1 is a side elevation of a plow equipped with the improved steering-connection. Fig. 2 is a plan view of the connection. Fig. 3 is a detail elevation of the adjustable connection between the steering-rods, viewed from the landside. Fig. 4 is a detail perspective of the lug or bracket for connecting the operating bar to one of the steering rods. Fig. 5 is a detail elevation of a modified form of the invention.

The improved steering-connection is illustrated as applied to a plow of usual construction comprising a frame 10, plow beam 12, plow-share 13, a land-wheel 14, front furrow or caster-wheel 15 and a rest caster or furrow wheel 16; all of which may be of usual or any suitable construction. The front wheel is journaled on an axle 17 secured to a standard 18 which is journaled in a bracket secured to a frame 10, and the rear wheel is journaled on an axle 19 secured to a standard 20 which is journaled in the usual bracket 21. To the standard 18 for the front furrow-wheel is secured an inwardly extending arm 22 and to the upper end of standard 20 for the rear furrow wheel is secured an outwardly extending arm 23. The steering-connection extends between said arms to cause the furrow-wheels to turn in opposite directions respectively, the turning of the front wheel being usually controlled by the tongue 24 as well understood in the art. .

The steering-connection comprises a rod 25 operatively connected as at its front end to the arm 22 or in any usual manner so it will respond to the lateral movement of the tongue, and a rod 26 which has its rear end pivotally connected to the distal end of arm 23 to control the rear caster or furrow-wheel. An adjustable connection for lengthening or shortening the reach of the rods comprises a bracket 27 provided with lugs 28 through which the rear end of rod 25 extends and in which the bracket and rod are secured together in desired relative position by bolts 29. A hand-lever 30 is pivoted to bracket 27 as at 31 and is provided with the usual finger-lever controlled lock 32 adapted to engage a segmental rack 27' integrally formed with bracket 27. The lever is connected to an adjusting-bar 33 which is pivotally connected to the lever as at 34 and has its rear end bolted as at 35 to a bracket 36, in which is secured the front end of rod 26 by a bolt 37. Lever 30 is thus connected by means of bar 33 to shift rod 26 which extends to the arm 23 for the rear furrow-wheel. Bracket 36 is provided with a lug or abutment 38 adapted to engage the bar 33 to securely connect rod 26 and bar 33 against vertical play and maintain the desired length of reach.

The invention designs to cause the adjusting-bar 33 to sustain the rod 26 vertically with respect to the rod 23 so that a sliding connection between the rods may be avoided and for this purpose bar 33 extends forwardly of its point of connection 34 with the hand-lever as at 39 and a vertically extending link 40 is pivotally connected at one end as at 41 to the front end of the adjusting-bar and at its other end is connected as at 42 to a forwardly extending lug 27ª of bracket 27. Link 40 is disposed in substantially parallel relation with respect to the hand lever to form a connection whereby the rods are connected firmly and rigidly so that they will support each other transversely leaving the entire connection free to respond to the movement of the tongue or front furrow wheel. In other words, the link serves as an adjustable connection for transversely securing the rods or members of the steering-connection so they will be rigidly tied together, without a sliding connection. For convenience in construction, the adjusting-bar 33 and bracket are employed but in lieu thereof one of the rods 26ª may be extended for direct connection to the hand-lever and link as illustrated in Fig. 5.

In operation, the hand-lever 30 is usually in vertical position but in hillside work it may be adjusted to angle the rear wheel with respect to the line of draft to crowd the plow either to or from land as desired, to rectify any tendency of the plow to move to or from the land. Upon release of the hand-lever from rack 27', link 40 will swing with the lever and retain the connection rigid and operative in either position of the lever. When the lever is locked, the link is likewise and thus the entire connection is rendered rigid.

The invention possesses several important advantages. Manifestly all sliding-joints or connections are dispensed with and the several parts of the adjusting-connection are pivotally connected in such manner that these rods are transversely and rigidly connected.

The invention is not to be understood as restricted to the details set forth but may be modified without departing from the spirit and scope of the invention.

Having thus described the invention, what I claim as new and desire to secure by Letters Patent, is:

1. In steering mechanism for plows, the combination of a connection comprising a pair of members connected at the front and rear to movable elements respectively, a lever fulcrumed on the connection so that it will be shifted longitudinally, and for relatively adjusting said members to vary the length of said connection, locking-means for said lever and means pivotally connected to the members respectively, for rendering the connection transversely rigid.

2. In steering mechanism for plows, the combination of a connection comprising a pair of members connected at the front and rear to movable elements respectively, a lever fulcrumed on the connection so that it will be shifted longitudinally, and for relatively adjusting said members to vary the length of said connection, locking-means for said lever and a link pivoted to the members respectively for rendering the connection between the members transversely rigid.

3. In steering mechanism for plows, the combination of a connection comprising a pair of members connected at the front and rear to movable elements respectively, a lever fulcrumed on the connection so that it will be shifted longitudinally, and for relatively adjusting said members to vary the length of said connection, locking-means for said lever and a link in substantially parallel relation with respect to the lever and respectively pivoted to the members for rendering the connection between the members transversely rigid.

4. In steering mechanism for plows, the combination of a connection comprising a pair of members connected at the front and rear to movable elements respectively, a lever having a fulcrum on one of said members and pivoted to the other of said members for relatively adjusting said members to vary the length of the connection, locking-means for said lever and means for rendering the connection transversely rigid.

5. In steering mechanism for plows, the combination of a connection comprising a pair of members connected at the front and rear to movable elements respectively, a lever having a fulcrum on one of said members and pivoted to the other of said members for relatively adjusting said members to vary the length of the connection, locking-means for said lever comprising a link respectively pivoted to said members and means for rendering the connection transversely rigid.

6. In steering mechanism for plows, the combination of a connection comprising a pair of members connected at the front and rear to movable elements respectively, a lever having a fulcrum on one of said members and pivoted to the other of said members for relatively adjusting said members to vary the length of the connection, locking-means for said lever and a link in substantially parallel relation with respect to the lever and pivoted to said members respectively for rendering the connection transversely rigid.

CLINTON W. DICKINSON.

Witnesses:
 FRED GERLACH,
 LEONE S. RUSSELL.